United States Patent [19]

Nöthen

[11] 4,020,881
[45] May 3, 1977

[54] AUTOMATIC FILLING OF FLOWER POTS

[76] Inventor: Günther Nöthen, Provinzialstr. 98, 5216 Niederkassel-Mondorf, Germany

[22] Filed: Dec. 21, 1971

[21] Appl. No.: 208,793

[30] Foreign Application Priority Data

Dec. 22, 1970 Germany .......................... 2063002

[52] U.S. Cl. ..................................... 141/1; 47/1 A;
53/36; 53/239; 53/282; 141/98; 141/125;
141/131; 141/163; 141/174; 214/8.5 G

[51] Int. Cl.² ......................................... B65B 1/00

[58] Field of Search ............. 141/98, 129, 131–134,
141/163, 1, 9, 125, 173, 174, 249; 53/36, 282,
239; 47/1, 36.6, 36.7; 211/74; 214/8.5 G

[56] References Cited

UNITED STATES PATENTS

| | | | |
|---|---|---|---|
| 605,677 | 6/1898 | Odin | 141/125 X |
| 655,545 | 8/1900 | Bristol | 141/125 X |
| 1,528,978 | 3/1925 | McClellan | 141/129 |
| 2,728,510 | 12/1955 | Dunnican et al. | 141/125 |
| 2,826,003 | 3/1958 | Oki et al. | 47/1 |
| 2,906,412 | 9/1959 | Tanner | 211/74 |
| 3,012,370 | 12/1961 | Lortz et al. | 47/1 |
| 3,069,050 | 12/1962 | Brettrager | 214/8.5 G X |
| 3,112,590 | 12/1963 | O'Brien | 141/174 X |
| 3,542,210 | 11/1970 | Sorensen | 211/74 |
| 3,587,675 | 6/1971 | Tucci | 141/237 X |
| 3,590,973 | 7/1971 | Sorensen | 53/282 X |
| 3,602,377 | 8/1971 | Sims | 214/8.5 G X |
| 3,605,921 | 9/1971 | Mayer | 47/1 |
| 3,620,387 | 11/1971 | Elson et al. | 214/8.5 G X |
| 3,713,465 | 1/1973 | van Nobelen | 141/134 |

*Primary Examiner*—Jerry W. Myracle
*Assistant Examiner*—Charles Gorenstein
*Attorney, Agent, or Firm*—P. D. Golrick

[57] ABSTRACT

In successive aligned groups, flower pots are gravity filled with earth in slight excess, the top compacted and leveled and a conical hole drilled in each to receive a plant, each successive operation being simultaneously carried out for the several pots in each group. To carry out this method a machine is disclosed with a horizontally moving conveyor reach on which empty pots are magazine-deposited, for intermittent movement, to pass successively to a station at a funnel-like earth filling device, to a station at a leveling device, to a station at a hole drilling device producing a conical, plant-ball receiving hole in each pot's earth fill; in particular embodiments the conveyor reach accepting from a tray magazine pot receiving trays holding pots in rows and columns, or the reach being a conveyor belt, plain or apertured to receive the pots in successive transverse rows; the earth conveyed from a storage hopper to a bucket elevator feeding said filling device; the hopper being disposed also for gravity return of earth removed at the leveling station.

7 Claims, 3 Drawing Figures

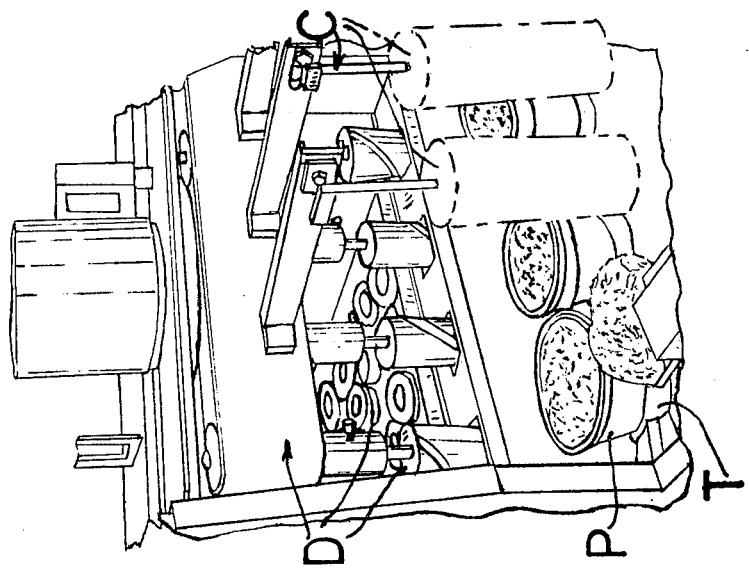
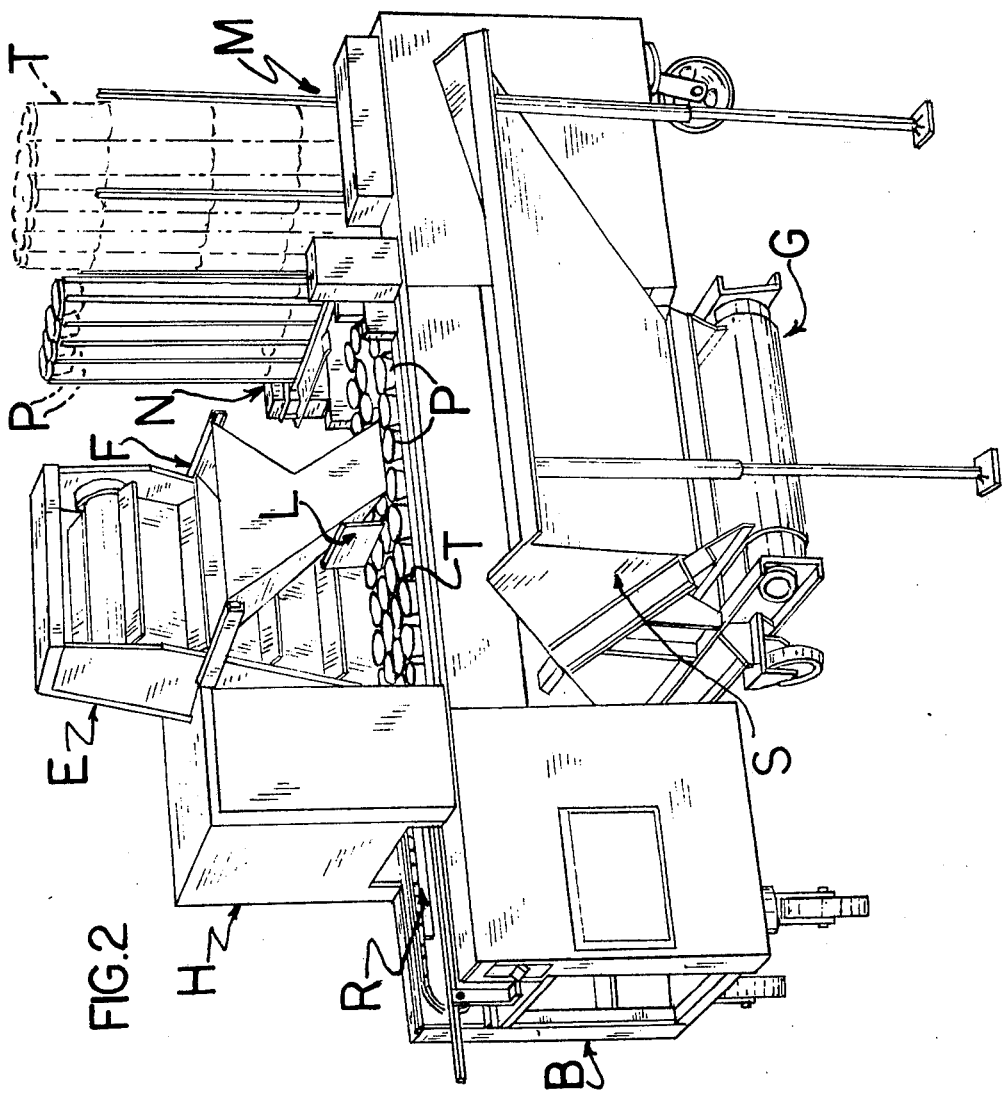

AUTOMATIC FILLING OF FLOWER POTS

Among flower pot filling machines, so-called potting machines, hitherto available on the market for filling flower pots with earth ultimately to receive small or young plants, in some the filling of the pots is automatically achieved, but individually one-by-one, and accordingly with these machines the employment is unavoidable of an extra operator for the manual removal of the filled pots and placing them in a shallow box or tray or like receptacle for further handling.

Hitherto known potting machines, as a rule, comprise a magazine with flower pots, stacked therein in a nested relation. The automatic filling is attained by a conveyor belt to which an indivdual pot is delivered from the pot magazine to be carried under an earth supply station for filling with earth, subsequently to be leveled by apparatus lightly pressing on the earth in the pot; and then to a hole-drilling station, where a device drills a concial hole in the middle of the filled pot for reception of the small, root embracing earth ball of the young plant. The completely worked pots are then carried further on the conveying belt from which they are finally indiviually removed.

The entire aforedescribed process is performed completely automatically as far as it goes, and all hitherto known potting machines, in principal, operate in accordance with this system.

A special pot receptacle or tray has been described and introduced into use for the reception of the filled flower pots to serve more or less as a pallet; the tray or receptacle being of light weight and adapted to receive and maintain the pots in definite, spaced locations, arranged in rows and columns. This tray has multifarious and universal applications in the horticultural business. Thus, for example, pots filled in a potting machine, upon leaving the machine can be placed (hitherto done individually and by hand) in this receptacle to remain therein during the entire subsequent handling of the pots, that is, from the time of removal from the potting machine, through the actual setting of plants therein, and on up to the last end point of use, even up to sale; the pots needing not to be removed from this receptacle, even during the time in which they stand in a forcing house for the growth of blooms.

The invention to be described hereinafter represents a significant extension of and improvement on the above described known method and, moreover, in contrast therewith allows an essentially speedier and consequently also a more rational operation; and although in its broader aspects not dependent thereon, in preferred operation it utilizes the previously mentioned recently developed special receptacle, which is strong, light, yet relatively open to avoid retention of soil on surfaces thereof, and especially adapted for low cost plastic production.

It is one object of the present invention to provide an improved method for filling flower pots with earth and readying them for the reception of young plants.

Another object of the present invention is to provide an improved machine for filling of flower pots and readying them for implantation with small plants.

Other objects and advantages will appear from the following description and the drawings wherein:

FIG. 2 is a front generally elevational view (somewhat in perspective) of a machine in accordance with the invention;

FIG. 2A is a perspective view of apparatus components at a hole-forming and tray-cleaning station.

In the following description at times the same reference character will be used to designate both a machine station or location where a certain operation is carried out, and also the general structure or device for performing such operation.

Figure 1:
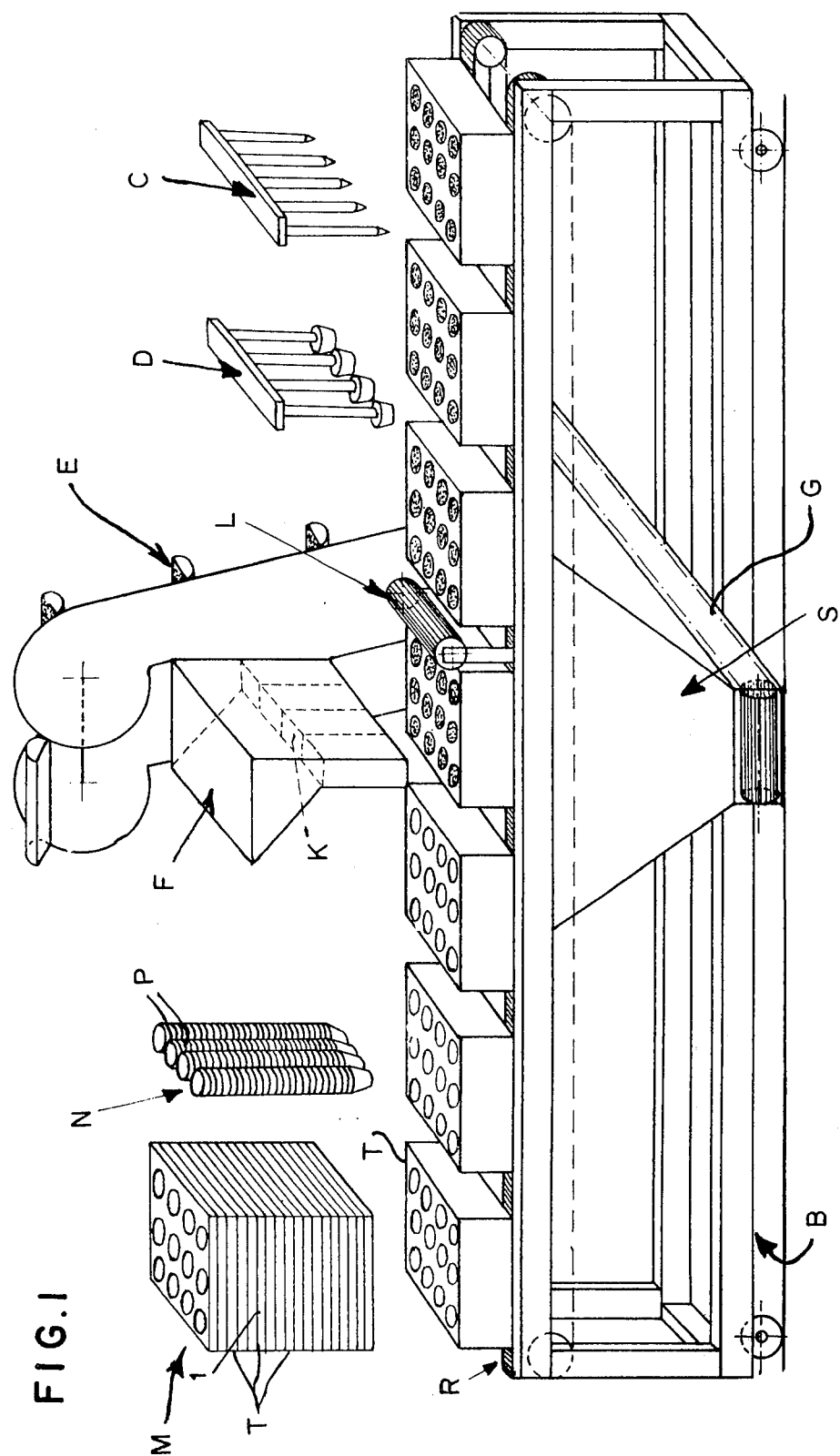
FIG. 1 is a somewhat schematic or generalized representation of a new potting machine, which is primarily intended to show the steps of a method in accordance with the present invention.

The appartus shown in FIG. 1 for carrying out the invention includes a frame B, here wheeled for convenience and at the generally open top having and defining a path for an intermittently driven conveyor reach R, above which on the frame there are successively supported, at a tray feed station M, a tray magazine for the reception of the pot carrying receptacles T; at a pot feed station N, a magazine for nesting stacked flower pots P; at a filling station, a pot filling earth funnel F; at an earth leveling station L, a leveling device for leveling and somewhat compacting the earth in the pots; at a hole forming station D, a multiple hole drilling device for drilling a plant receiving hole in the earth in each pot; and a tray cleaner station C, which may be considered optional, its utility being dependent upon the specific form of the trays T and their consequent earth retaining areas, if any.

To supply earth to the filling funnel F, the machine further includes, at the middle of the frame and extending under the conveyor R, a large open-mouthed earth supply hopper S, from the bottom of which a transverse belt conveyor G feeds the earth to an inclined bucket elevator conveyor device E, of which the successive ascending buckets, in swinging over at the elevator top to start downward travel back to conveyor G, each dumps its earth load into the open top of the filling funnel F, the latter serving to direct the earth into respective pots arrayed therebeneath; any earth spillage from the pots and trays at a filling, leveling, drilling and cleaning stations dropping through the generally open conveyor reach back to hopper S.

The nestable trays T are schematically shown as each of rectangular outline and providing in each a plurality of pot-accepting apertures arrayed in rows transversely to the conveyor travel direction, herewith four apertures per row and three rows. From the bottom of the tray magazine M, a tray T is automatically released at pre-determined or programmed intervals and positioned on the paired, simultaneously intermittently moved endless conveying chains forming the conveyor R, and traveling of course in the direction from the tray magazine to the pot magazine.

The tray conveyor is intermittently advanced in and by known manner and means, so that with the prevailing effective spacings of the stations, of the tray aperture rows and of the trays themselves, the movement pattern or cycle brings the apertured rows in each tray to a stop precisely under the four-pot discharging magazine at station N, and so also at least under the four ganged drills of the drill device at station D, though preferably also at the filling funnel F.

Thus at pot magazine N, in effect a multiple magazine for several stacks (here four) of nested empty flower pots, there being either a mechanical or electrical interlock between the conveyor R or its drive system and the magazine release, four pots, are simultaneously released through a single control impulse, one from each stack and directed to a respective tray aperture therebeneath, as soon as a pot tray T is advanced on the conveyor chain reach so far that it stands with a row of its receiving openings under the pot magazine.

The filling funnel F has several conducting guiding passages or chutes K to divide and distribute the earth supplied thereto to the respective pots P arrayed next to each other in a row of the receptacle T; and since excess soil returns to hopper S, in a simpler control and drive arrangement the earth may be supplied from S, through G and E to the funnel F continuously, without attempting to time the dumping of one bucket per pot row; or the chutes within the funnel may be dischargeable by a common simultaneously releasing shutter mechanism.

However, the device at each station especially stations N, F, and D may be brought into operation only at such time a respective tray-borne pot row is brought thereunder.

The pot leveling device L comprises here a rotating cylindrical brush with its axial horizontal and transversely disposed to the conveyor reach to level the filled pots passed thereunder in row array by sweeping excess earth from their top surface, simultaneously pressing the earth somewhat into the pot, and also, depending upon the tray form, to some degree sweeping earth from the tray, the excess returning to the supply hopper S.

The intermittently advanced conveyor R carries the tray with the filled pots to the hole-forming or drill station D where the drill device comprises a corresponding number of ganged rotating hole drills, mounted to move simultaneously up and down, and in their downward movement to drill a conical hole in each filled pot. The holes correspond in size to the size of the small root-enclosing earth balls of the young plant to be later planted in the pots.

As a last working station on the conveyor path, there is shown a cleaning apparatus C having a corresponding number of ganged sweeping brushes which move up and down simultaneously with the hole-drills, and upon their downward movement sweep earth to and push it either out through earth drop-through holes or openings arranged between the pot receiving apertures of, or off, the tray; most of the soil residues between the individual pots arising in consequence of the drilling. Such a sweeping device can be operable as a separate unit as well as being connected also with the hole-drilling unit.

FIG. 2 shows somewhat more particularly a machine of the type described for FIG. 1, similar stations or devices being designated by the same characters as those in FIG. 1, the housing H enclosing the stations and devices D and C for drilling of the soil in the pots, and for cleaning the trays (see FIG. 2A); the device L appearing as a screen-like plate supported by the funnel to strike off earth from pots passing thereunder.

The paired flat endless chains shown disposed along each longitudinal side of the frame top and engaging the trays near opposite sides are preferable to the alternative of a single broad flat belt to support the trays, especially since the excess earth can fall more directly to the supply hopper; and so also to a conveyor with a belt having rows of apertures to receive the pots directly rather than with a tray interposed at the start of the working path although the latter would perform a broader method aspect of the invention.

Thus by the inventive method, the machine at the tray station M places, in successively spaced relation on the conveyor R, trays T having transversely arrayed pot receiving apertures, moves the trays intermittently so that each aperture array is brought to a halt under the pot discharging or supplying station N with a correspondingly numbered array of pots dropped into the aperture array; the tray-held pots are brought under the funnel of the filling station for filling with earth; with continued tray advance, the pots arrays are passed under the leveler device L; each successive array is brought to a halt in the drilling station D for hole drilling; and with or without a post-drilling cleaning, finally each tray is carried by the horizontal conveyor R to its end region, either to be discharged to another conveyor for further work, or taken by an operator from the conveyor discharge end; there being no need, however, for an extra operator merely to load filled pots into a tray as by prior methods and machines. By a machine as described the entire method may be carried out automatically.

I claim:
1. A method for filling of flower pots with earth or the like and preparing them to receive balled young plants, comprising the successive steps of:
  successively discharging, from a magazine onto a horizontal linear conveyor, like trays each having pot-receiving apertures arrayed in a plurality of transverse rows and earth drop-through holes between the apertures;
  moving said trays incrementally by row spacings on said conveyor through the hereinafter named stations successively;
  at a pot supply station, magazine filling successive rows of each tray with pots as the tray is halted in incremental movement, all the apertures of each row being simultaneously filled;
  filling earth simultaneously into the pots in each row with a slight excess of earth at an earth filling station as each successive row of tray-arrayed pots is brought to a halt beneath the earth filling station by the incremental tray movement;
  sweeping excess earth from the filled pots as they move from the earth filling station through a leveling station toward a hole-forming station;
  in the incremental tray advance, halting the successive pot rows at the hole forming station and forming a generally centered hole in the earth of each pot simultaneously for all pots in a row while the tray is stationary; and
  transporting each tray away from the hole forming station.

2. A method as described in claim 1, wherein
  earth delivered in excess at a said filling station, and earth removed from the top of pots at said leveling station and at said hole forming station, is returned to an earth supply source feeding to said filling station.

3. A method as described in claim 1, wherein
  excess earth is swept from filled pots by passing the trays of filled pots under a stationary screed edge disposed horizotally transverse to the tray advance direction.

4. For filling of flower pots carried in like trays each having a plurality of transverse rows of pot-receiving apertures, apparatus comprising:
  a horizontal extended frame;
  a conveying mechanism including a linear moving tray-receiving reach horizontally disposed on the frame and driven to move trays intermittently and by increments corresponding to tray row spacings, from an input to a discharged end;

a tray magazine on the frame at and above an input end of the conveyor mechanism discharging trays successively onto said reach;

a pot magazine on the frame above, and spaced from the tray magazine along the reach, said pot magazine discharging pots simultaneously to fill the apertures of each row, the rows being filled successively;

a pot filling device above the reach and spaced in the direction of conveyor travel from the pot magazine, and including a funnel-like earth receiver with a downward mouth opening elongated transversely of the reach to fill simultaneously all the pots in at least one row of a tray therebeneath;

an earth leveling device and a hole forming device disposed on said frame above and spaced successively along the conveying reach in the direction of conveyor travel;

said leveling device including an element extending transversely across said reach for removing excess earth from the top of tray-carried filled pots passed thereunder;

said hole forming device comprising a ganged plurality of simultaneously vertically reciprocable elements arranged in a spaced series transversely of said reach with spacing corresponding to the center-to-center spacing of pot-receiving apertures of a said row for forming respective plant-receiving holes in the earth fill of tray-carried pots;

an earth supply hopper disposed beneath said reach, said reach permitting earth falling from said trays at the filling, leveling and hole forming devices to drop back to said hopper; and earth conveying means for conveying earth from said hopper to said earth receiver of the filling device;

whereby trays are successively fed onto said conveyor reach and completely automatically carried under the pot magazine, the pot earth filling device, the leveling and the hole drilling device, the individual stations then becoming operative when a row of pot openings attains the proper disposition under the respective device.

5. Apparatus as described in claim 4, further including a tray cleaning device associated with the said hole forming device comprising a ganged plurality of elongated brushes reciprocating with the elements of the hole forming device to sweep earth through tray earth drop-through openings between pot receiving apertures, thereby to clean earth from the tray.

6. Apparatus as described in claim 4, wherein said leveling device comprises a screed element externally associated with the said earth receiver and located in the direction of conveyor travel from the said mouth of the receiver.

7. Apparatus as described in claim 4, wherein said leveling device comprises a generally cylindrical brush rotating about an axis disposed horizontally and transverse to the conveyor and located in the direction of conveyor travel from the said mouth of the receiver.

* * * * *